United States Patent
Ng et al.

(10) Patent No.: US 7,883,242 B2
(45) Date of Patent: Feb. 8, 2011

(54) LIGHT EMITTING DIODE LIGHT BULBS WITH STRANDS OF LED'S

(76) Inventors: Kai Kong Ng, Block A, 10/F, Mai Wah Industrial Building, 1-7 Wah Sing Street, Kwai Hing N.T. (HK); Kuo-Chiu Chiang, Block No. 5, Xialang Industrial Zone, Qishi Town, Dongguan City, GP (CN)

( * ) Notice: Subject to any disclaimer, the term of this patent is extended or adjusted under 35 U.S.C. 154(b) by 59 days.

(21) Appl. No.: 12/078,549

(22) Filed: Apr. 1, 2008

(65) Prior Publication Data

US 2008/0285279 A1  Nov. 20, 2008

(30) Foreign Application Priority Data

Apr. 23, 2007  (TW) .............................. 96206431 U

(51) Int. Cl.
   *F21S 4/00*      (2006.01)
   *H01R 33/945*  (2006.01)

(52) U.S. Cl. .............................. 362/249.06; 362/249.02; 362/650; 362/363

(58) Field of Classification Search ................. 362/650, 362/800, 363, 249.02, 249.06, 244, 246, 362/248, 186, 555
   See application file for complete search history.

(56) References Cited

U.S. PATENT DOCUMENTS

| | | | | |
|---|---|---|---|---|
| 4,298,869 A * | 11/1981 | Okuno | ......................... | 345/82 |
| 4,510,556 A * | 4/1985 | Johnson | ..................... | 362/184 |
| 5,418,697 A * | 5/1995 | Chiou | ......................... | 362/473 |
| 5,463,280 A * | 10/1995 | Johnson | ....................... | 315/187 |
| 5,575,459 A * | 11/1996 | Anderson | .................... | 362/240 |
| 5,688,042 A * | 11/1997 | Madadi et al. | .............. | 362/240 |
| 5,726,535 A * | 3/1998 | Yan | ......................... | 315/185 R |
| 5,806,965 A * | 9/1998 | Deese | .................... | 362/249.04 |
| 5,921,660 A * | 7/1999 | Yu | ........................ | 362/249.03 |
| 5,924,784 A * | 7/1999 | Chliwnyj et al. | ............ | 362/234 |
| 6,220,722 B1 * | 4/2001 | Begemann | .................. | 362/231 |
| 6,580,228 B1 * | 6/2003 | Chen et al. | .............. | 315/185 R |
| 6,621,222 B1 * | 9/2003 | Hong | .......................... | 315/51 |
| 6,926,423 B2 * | 8/2005 | Bucher et al. | ............... | 362/184 |
| 7,029,146 B2 * | 4/2006 | Kitchen | ....................... | 362/235 |
| 7,332,878 B1 * | 2/2008 | Smith | ......................... | 315/299 |
| 7,597,455 B2 * | 10/2009 | Smith et al. | ............ | 362/249.01 |
| 2005/0254248 A1 * | 11/2005 | Lederer | ...................... | 362/392 |
| 2006/0232974 A1 * | 10/2006 | Lee et al. | .................... | 362/294 |
| 2008/0094857 A1 * | 4/2008 | Smith et al. | ................. | 362/649 |

OTHER PUBLICATIONS

"Lamp (electrical component)." *Wikipedia, The Free Encyclopedia*. Jun. 24, 2008 <http://en.wikipedia.org/wiki/Lamp_%28electrical_component%29>.

"150 LED Light Bulb, Clear, White." *X-treme geek*. Jun. 24, 2008 <http://www.x-tremegeek.com/templates/SearchDetail.asp?productID=13111>.

* cited by examiner

*Primary Examiner*—Ismael Negron

(57) ABSTRACT

An LED light bulb includes a base and a hollow shell. The base has a closed end, an open end and a sleeve between the two ends. The shell is connected to the open end of the base. The LED light bulb includes at least two LEDs substantially linearly arranged within the shell, and supported by a self-supporting wire connecting one terminal of an LED to the next LED in each strand.

16 Claims, 10 Drawing Sheets

LIGHT EMITTING DIODE LIGHT BULBS WITH STRANDS OF LED'S

CROSS REFERENCE

This application is based on Republic of China (Taiwan) Application No. 0096206431 filed Apr. 23, 2007, the entirety of which is hereby incorporated by reference.

FIELD OF THE INVENTION

The present invention relates to a light bulb. In particular, the present invention relates to a light emitting diode (LED) light bulb that comprises one or more light emitting diodes (LEDs) in one or more substantially linear arrangements.

BACKGROUND OF THE INVENTION

Most existing light bulbs are incandescent light bulbs or fluorescent light bulbs. An incandescent light bulb typically comprises a base, a glass shell, a thin filament which is normally a thin tungsten filament within the shell, and an inert gas within the shell. When an electric current passes through the tungsten filament and heats it up to an extremely high temperature (2000° C. to 3000° C. depending on the filament type, shape, size, and amount of current passed through), heat radiation occurs and visible light is produced. However, the incandescing process is considered highly inefficient, as over 98% of its energy is emitted as invisible infrared light (or heat) and the luminance cannot further improve. In addition, the typical lifespan of an incandescent bulb is limited to about 1,000 hours.

By comparison, a fluorescent light bulb is filled with gas containing low-pressure mercury vapor and an inert gas such as argon or xenon. The inner surface of the bulb is coated with a fluorescent (and often slightly phosphorescent) coating made of various blends of metallic and rare-earth phosphor salts. When electricity passes through mercury vapour, the mercury vapour produces ultraviolet light. The ultraviolet light is then absorbed by the phosphorus coating inside the bulb, causing it to glow, or to fluoresce. While the heat generated by fluorescent light is much less than its incandescent counterpart, efficiencies are still lost in generating the ultraviolet light and converting this light into visible light. In addition, mercury is considered detrimental to the health of people and animals. Therefore, if the fluorescent bulb breaks, exposure to the substance can be hazardous. Fluorescent bulbs are typically more expensive than incandescent bulbs, but they have life spans of about 10,000 hours.

A light emitting diode light bulb is another type of light bulb. The LED bulb typically has high durability with no need to worry about the filament breaking as occurs with respect to incandescent bulbs or the noted hazards as can occur with respect to fluorescent bulbs. LED light bulbs have a long life span of approximately 50,000 to 100,000 hours. The LED bulb generates little heat and has little parasitic energy loss, thereby reducing the overall electricity used. This, in turn, increases the possibilities of reducing electricity bills. Since the LED light bulb has so many advantages over the incandescent bulb and the fluorescent bulb, it is considered to be a cost-effective yet high quality replacement for incandescent and fluorescent light bulbs.

There are already some LED bulbs in the market. These LED bulbs either contain one LED in the bulb or at least two LEDs horizontally fixed directly on one printed circuit board (PCB) in the bulb. For the bulb containing only one LED, the light is generally not bright enough. The luminance is hard to improve for a single bulb containing a single LED. For bulbs having at least two LEDs horizontally fixed on one PCB, the LEDs are in the same horizontal level and the distances that can be brightened by those LEDs are similar because of their attachment to the PCB. When the bulb shell increases in size, the LEDs will all have a longer distance to the bulb shell. As the distance from the LED to the shell increases, the brightness becomes weaker and dimmer. Light is governed by an increase-square law of physics namely that the intensity/strength of the light from a source is inversely proportional to the square of the distance from the source. Therefore, the use of LED bulbs in the prior art is limited to applications which do not have a high luminance requirement. In order to broaden the use of LED bulbs because of their so many advantages, limited luminance needs improvement.

SUMMARY OF THE INVENTION

According to an aspect of the invention, there is provided an LED light bulb. The LED light bulb has a hollow base, a hollow shell and at least two LEDs. The base has a closed end, an open end and a sleeve therebetween. The hollow shell is connected to the open end of the base. The LEDs are vertically arranged within the shell, for connecting to a DC power source.

The sleeve may serve as an electrode; the closed end has a contact point serving as another electrode; both the two electrodes are connected to the input of a power converter, which converts an AC power to the DC power to be supplied to the LEDs. The bulb further has an insulating part separating and insulating the two electrodes. The power converter can be arranged inside the hollow base or located outside of the bulb.

The shell may be made of transparent plastics, transparent glass or similar materials. The sleeve of the base may include external threading.

The LED bulb may further include a transparent support for maintaining the LEDs in a vertically arranged position, and the transparent support may be a hollow plastic stem, made of transparent plastics, transparent glass or similar materials.

The power converter may include a filter circuit, a bridge rectifier circuit, and a resistor. The bridge rectifier circuit is connected to the electrodes via the filter circuit, and the output of the bridge rectifier circuit is connected to LEDs via the resistor. The LEDs can be connected in parallel or in series. The LEDs can be vertically stacked within the shell The LED bulb according to the present invention, due to the vertical stacked arrangement, does not increase the distance from the LEDs to the top of the bulb shell when the bulb shell is bigger and higher, so luminance or brightness can be guaranteed by varying the number of LEDs in a bulb. In addition, the LED bulb according to the present invention consumes less energy than traditional incandescent or fluorescent bulbs and has a longer life (about 50,000 to 100,000 hours). It is also compatible with the bases of the existing bulb. Therefore, replacing a traditional bulb with one according the present invention is convenient and practical.

In accordance with an aspect of the present invention, there is provided a bulb, comprising:

a base, said base further comprising a closed end, an open end and a sleeve therebetween, wherein said sleeve serves as an electrode and said closed end comprises a contact point serving as another electrode;

a hollow shell connected to the open end of the base; and a strand of at least two LEDs joined together and substantially linearly arranged within the shell wherein said bulb is adapted for connection to a DC power source.

In accordance with another aspect of the present invention, there is provided the bulb of the present invention, further comprising a support for maintaining at least two LEDs in a substantially linear arranged position.

In accordance with another aspect of the present invention, there is provided the bulb of the present invention, wherein the support comprises a hollow plastic stem adapted to contain the at least two LEDs.

In accordance with another aspect of the present invention, there is provided the bulb of the present invention, wherein the substantially linear LEDs are oriented in a substantially vertical direction in relation to said bulb.

In accordance with another aspect of the present invention, there is provided the bulb of the present invention, wherein the base is hollow, and, within the hollow base, the bulb further comprises a power converter for converting AC power to DC power to be supplied to the LEDs.

In accordance with another aspect of the present invention, there is provided the bulb of the present invention, wherein both the two electrodes are connected to the input of the power converter; and the bulb further comprises an insulating part separating and insulating the two electrodes.

In accordance with another aspect of the present invention, there is provided the bulb of the present invention, wherein the power converter comprises a filter circuit, a bridge rectifier circuit, and a resistor; the bridge rectifier circuit is connected to the electrodes via the filter circuit, and the output of the bridge rectifier circuit is connected to LEDs via the resistor.

In accordance with another aspect of the present invention, there is provided the bulb of the present invention, wherein the sleeve of the base comprises external threading.

In accordance with another aspect of the present invention, there is provided the bulb of the present invention, wherein the shell is made of translucent or transparent plastic.

In accordance with another aspect of the present invention, there is provided the bulb of the present invention, wherein the shell is made of translucent or transparent glass.

In accordance with another aspect of the present invention, there is provided the bulb of the present invention, wherein the LEDs are connected in parallel.

In accordance with another aspect of the present invention, there is provided the bulb of the present invention, wherein the LEDs are connected in series.

In accordance with another aspect of the present invention, there is provided an LED bulb, the bulb comprising:
a base, said base further comprising a closed end, an open end and a sleeve therebetween, wherein said sleeve serves as an electrode and said closed end comprises a contact point serving as another electrode;
a hollow shell connected to the open end of the base; and
at least two substantially linear strands of LEDs wherein each substantially linear strand of LEDs further comprises at least two LEDs
wherein said bulb is adapted for connection to a DC power source.

In accordance with another aspect of the present invention, there is provided the bulb of the present invention, wherein said at least two substantially linear strands are joined together at one or more points along the length of said substantially linear strands.

In accordance with another aspect of the present invention, there is provided the bulb of the present invention, wherein said substantially linear strands are joined to form an array whereby each strand points in a different direction within said compartment.

In accordance with another aspect of the present invention, there is provided the bulb of the present invention, wherein said substantially linear strands are each oriented in a substantially vertical orientation within said compartment.

In accordance with another aspect of the present invention, there is provided the bulb of the present invention, wherein the LEDs are connected in parallel within each strand.

In accordance with another aspect of the present invention, there is provided the bulb of the present invention, wherein the LEDs are connected in series within each strand.

BRIEF DESCRIPTION OF THE DRAWINGS

The embodiments of the invention will be better understood by the detailed description thereof, with reference to the accompanying drawings, wherein like reference numerals refer to the like elements throughout, in which.

DETAILED DESCRIPTION OF THE INVENTION

Figure 1:
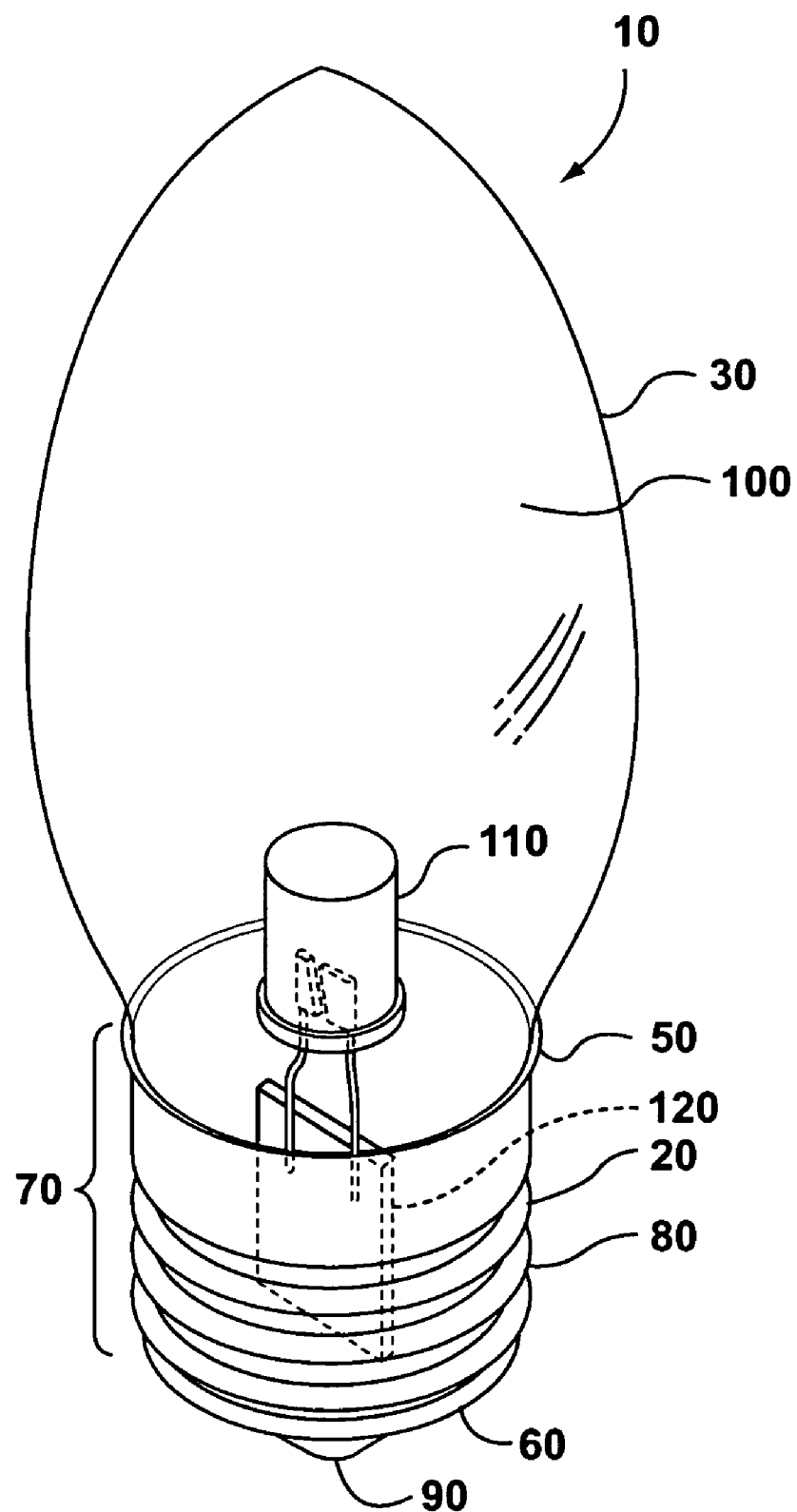
FIG. 1 is a perspective view of an LED bulb according to the prior art.

FIG. 1 illustrates an LED bulb according to the prior art. The LED bulb, generally shown as 10, comprises a hollow base 20 and a hollow shell or sometimes referred to as an envelope 30. For the instant application, the entire article illustrated, for example in FIG. 1, is called a bulb. The LED inside the bulb, for example LED 110, is called an LED. The base 20 has an open end 50, a closed end 60 and a sleeve 70 between the ends 50 and 60. The sleeve 70 has external threading 80 so as to match internal threading in a bulb holder (not shown) for installment. The sleeve 70 serves as an electrode. In the central part of the closed end 60 is located a contact point or portion, serving as another electrode 90, and an insulating portion (8171 in FIG. 7) separates and insulates the two parts 70 and 90. When the LED bulb 10 is installed in a bulb holder, such as in a desk lamp, parts 70 and 90, acting as electrodes, are connected to the electrical contact points in the bulb holder. The electrical contact points in the bulb holder are typically further connected to a plug or switch in order to provide electricity to the bulb thereby causing the LED's to light up.

The follow back shell or envelope 30 is connected to open end 50 of base 20 and thus forms an enclosed compartment 100 together with the closed end 60 of the base 20. Within the compartment 100, the bulb 10 comprises at least one an LED 110. Corresponding to the sleeve portion 70 in the compartment 100 is located a power converter 120, which converts AC to DC and supplies energy to at least one LED contained within the bulb 10. Alternatively, the power converter can be located outside of the LED bulb and supply DC power directly to multiple LED bulbs each constructed similarly to the prior art bulb 10 illustrated in FIG. 1.

Figure 2:
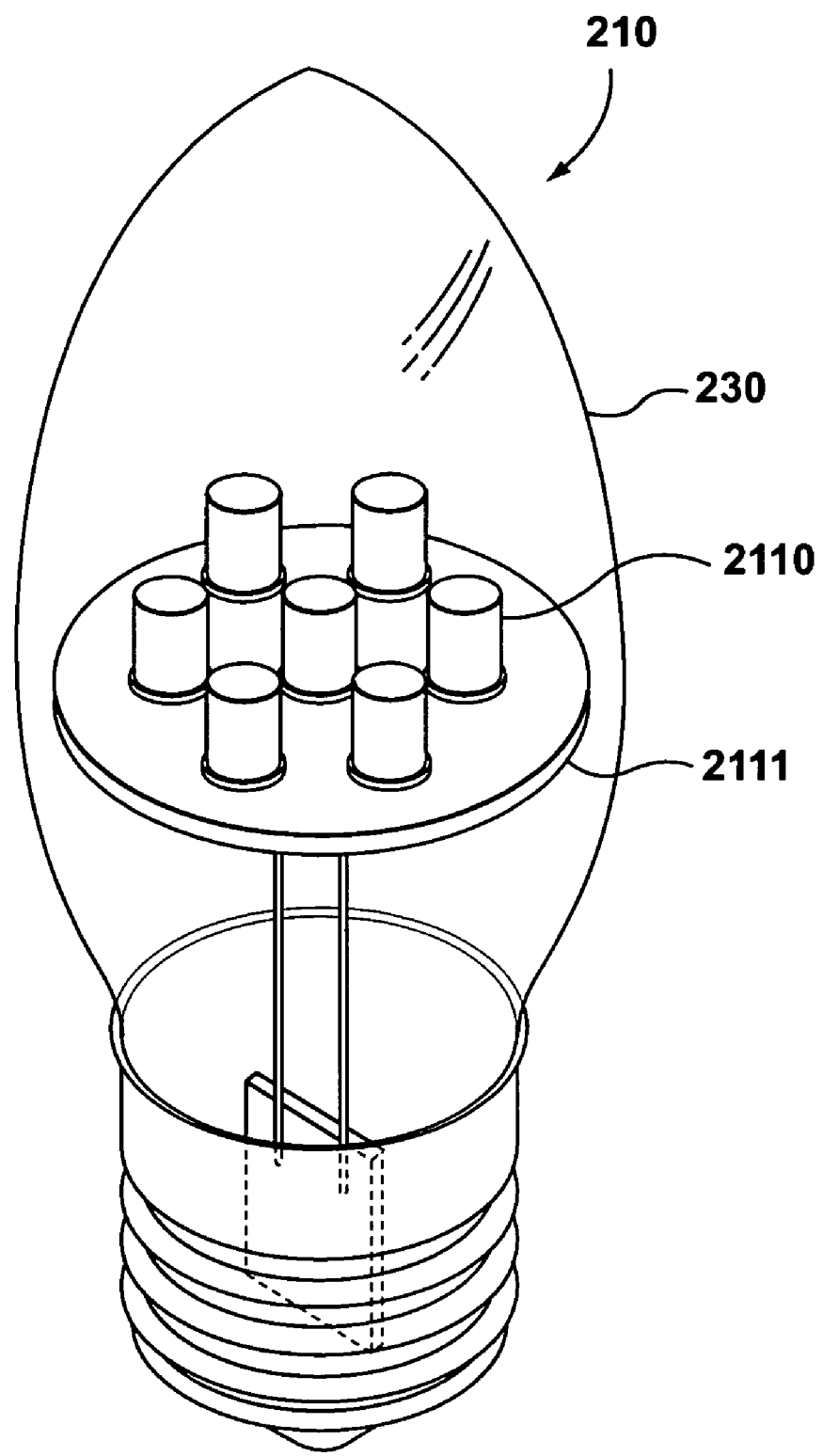
FIG. 2 is a perspective view of another LED bulb according to the prior art.

FIG. 2 illustrates another prior art LED bulb, 210. It is similar to the LED bulb in FIG. 1, and the only difference is that it comprises more than one LED, 2110, more specifically seven LEDs, within the shell 230. The seven LEDs in the prior art bulb 210 of FIG. 2 are horizontally fixed on a printed circuit board (PCB) 2111, with presumably a goal to enhance the luminance of the bulb. However, the distance that can be brightened is not much further than a bulb with a single LED, because all of the LEDs are grouped together in a common place.

Figure 2A:
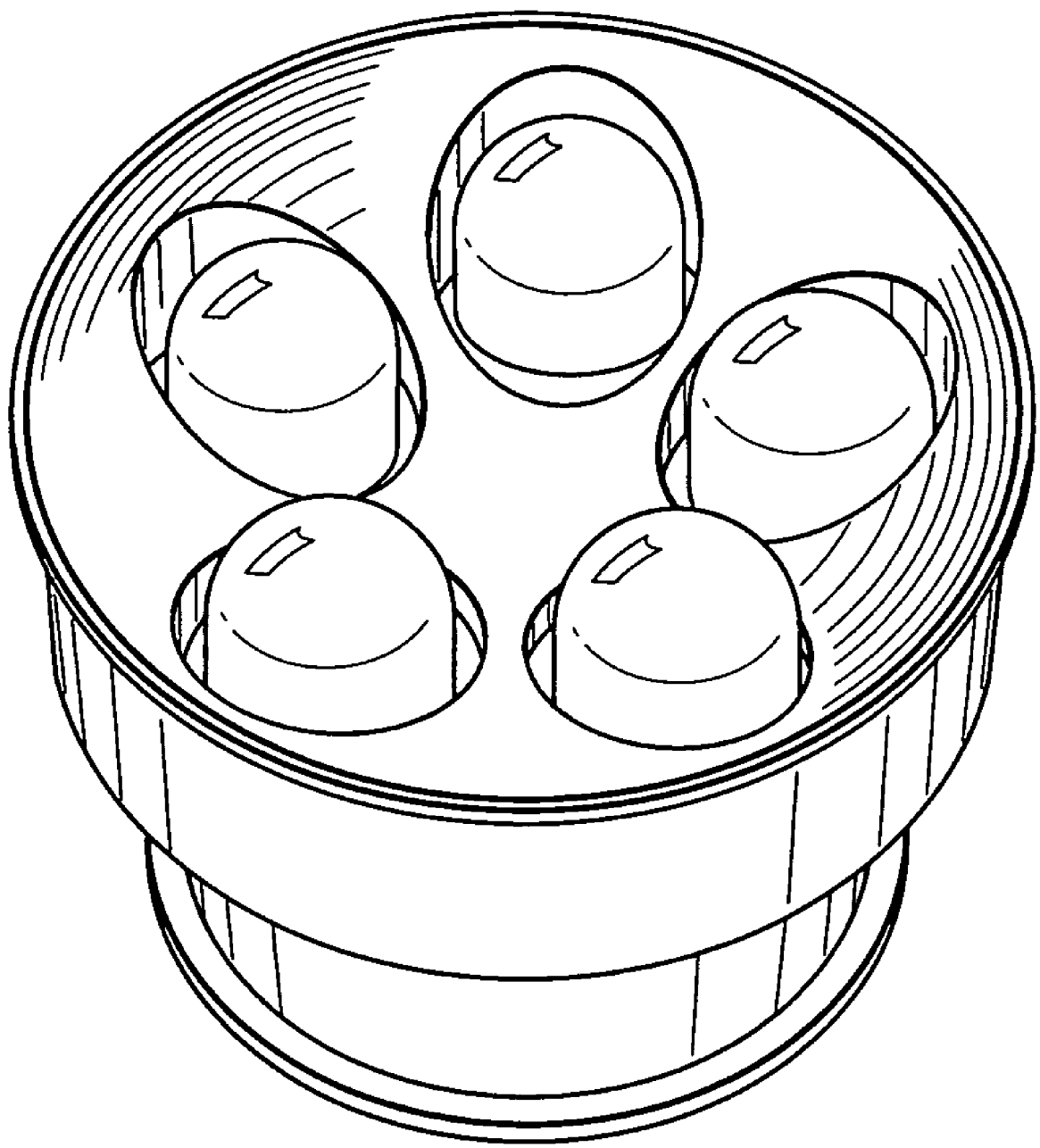
FIG. 2A is a perspective view of a portion of the prior art bulb illustrated in FIG. 2 and accordingly is prior art.

As light waves move away from the light source, the light waves spread out over a distance and quickly diminish in intensity. It is known that there is a light intensity decay over distance with light intensity decreasing quickly as the distance from the light source increases. The intensity of light is the power per unit of area. Area increases as the square of the distance therefore light decreases as the inverse square of the distance. Light intensity follows an inverse-square law. Therefore if all the LEDs are in the same or substantially the same horizontal plane, the brightness or light intensity of the bulb may not increase significantly between the prior art bulb in FIG. 1 and the prior art bulb illustrated in FIGS. 2 and 2A despite the additional LEDs present.

Furthermore, with more LEDs on a PCB, the bulb shell must be big enough to accommodate them. Since a bulb (for example bulb 10 or bulb 210) typically has a smaller diameter than its height (as illustrated), then a horizontal distribution of LEDs on a PCB will be limited by the size of the bulb shell the number of LEDs present in.

Figure 3:
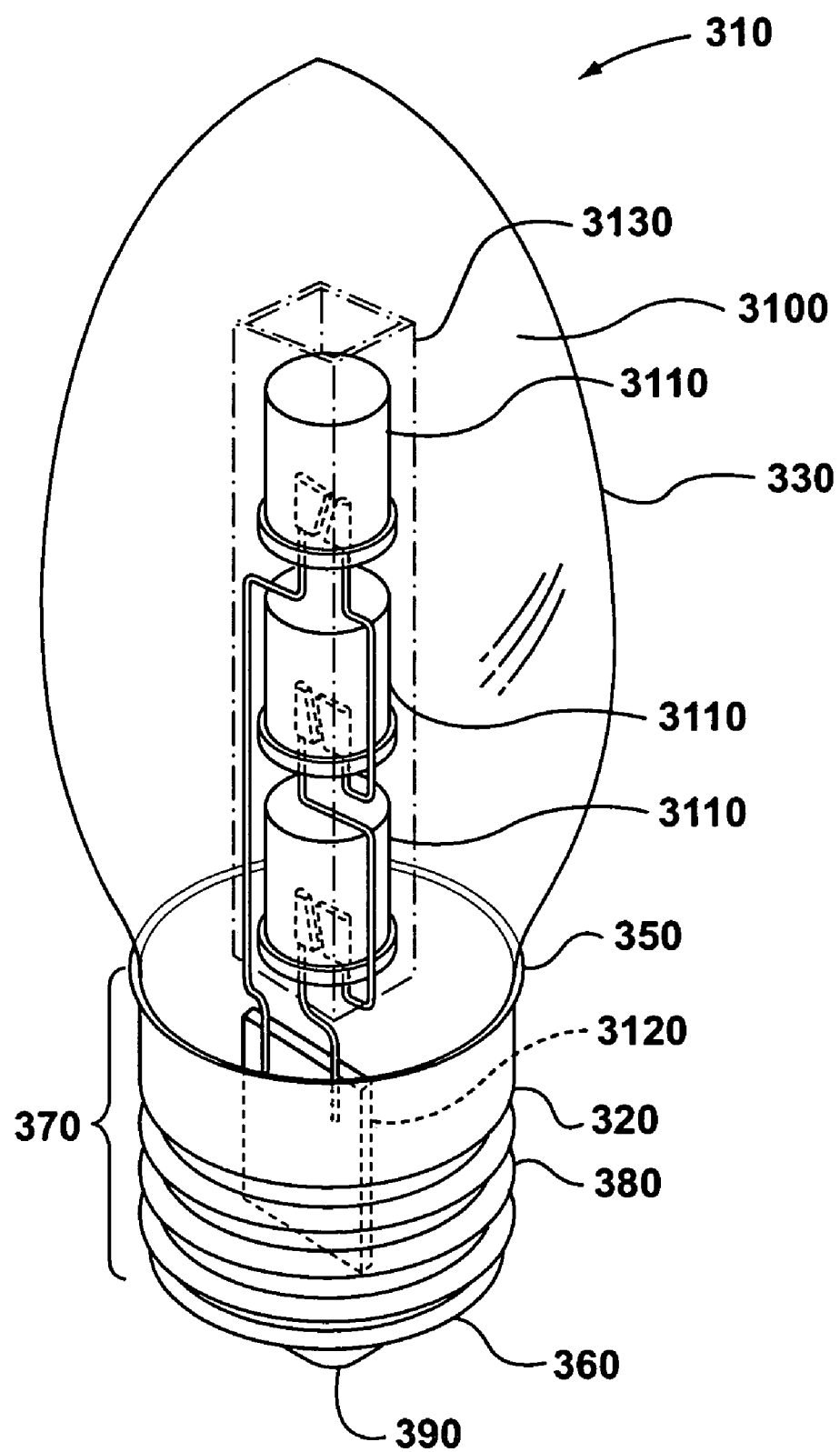
FIG. 3 is a perspective view of an LED bulb in accordance with one embodiment of the present invention.

FIG. 3 is an illustration of an LED bulb in accordance with one embodiment of the present invention. The LED bulb 310 comprises a hollow base 320 with an open end 350, a closed end 360 and a sleeve 370 therebetween. A hollow shell 330 is connected to the open end 350 of the base 320, and a compartment 3100 formed by the shell 330 and the base 320. The sleeve 370 has external threading 380 to be installed in an internally threaded bulb holder. The sleeve 370 serves as one electrode. The closed end 360 has a contact portion or point 390 serving as another electrode. An insulating part (8171 in FIG. 7), made of rubber or other insulating material, separates and insulates the two parts 370 and 390. In the sleeve portion 370 of the compartment 3100 is located a power converter 3120 for converting AC to DC and supplying DC power to the LEDs.

Unlike the prior art bulb in FIG. 1, the particular example illustrated by bulb 310 comprises three LEDs 3110 contained within the compartment 3100 so as to increase the luminance created by the bulb. The LEDs 3110 are stacked such that for all but the last LED in each strand, the envelope top end of any given LED of a strand substantially faces the base of an adjacent LED in the strand and connected in series with each other and also connected in series with the power converter. Although FIG. 3 illustrates three LEDs in the bulb, the number of LEDs contained in the bulb can vary from two to any number that can be arrayed within compartment 3100 depending on the dimensions of the bulb shell 330. Preferred embodiments comprise at least 2 LEDs.

The LED bulb 310 may further comprise a support. A support comprises any structure which abuts or surrounds the at least two LEDs in linear arrangement to support a vertical orientation or a particular direction. An example of a suitable support is illustrated in FIG. 3 illustrating a hollow transparent stem 3130 to support and maintain the LEDs 3110 in a substantially vertical alignment or linear alignment. The support can be made of translucent or transparent materials such as plastics or glass. It can be cloudy or clear or colored or colorless. The bulb shell can also be made of translucent or transparent glass or plastics and it can be cloudy or clear or clear or colored or colorless.

Figure 4:
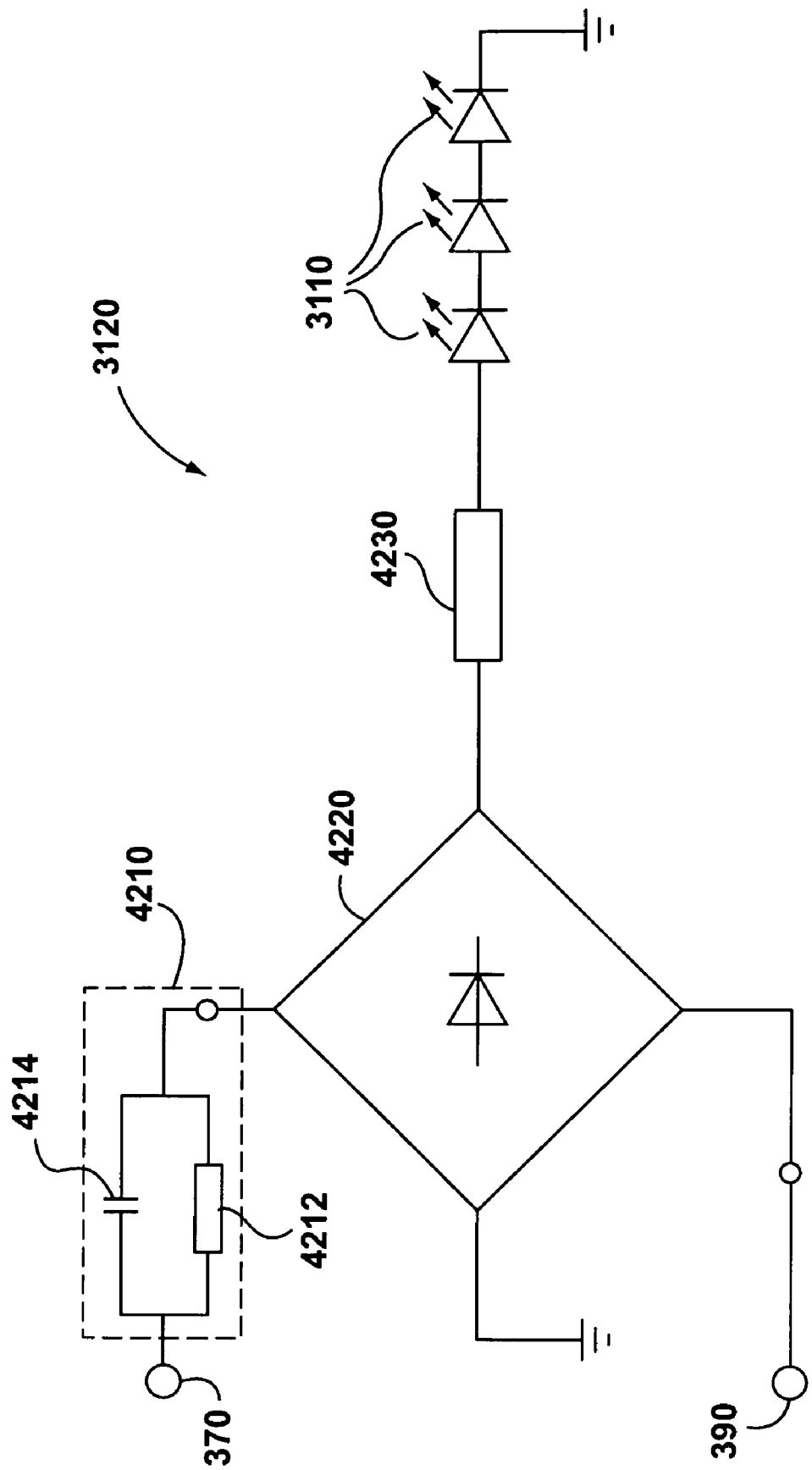
FIG. 4 is an electrical circuit of one part of the bulb of FIG. 3.

Referring to FIG. 4, the power converter 3120 comprises a filter circuit 4210, and a bridge rectifier circuit 4220, and a resistor 4230. The filter circuit further comprises a resistor 4212 and a capacitor 4214, connected in parallel. The bridge rectifier circuit 4220 is connected to the electrodes (power supply) via the filter circuit 4210, and the output of the bridge rectifier circuit 4220 is connected to LEDs 3110 via the resistor 4230. Thus the alternative current flowing to the LED bulb from the power supply connected to the plug of the bulb holder can be converted to direct current needed by the LEDs 3110, so as to cause the LEDs to emit light.

The power adaptor can also be located outside of the LED bulb and can be adapted to supply DC power directly to one or multiple LED bulbs. Furthermore, those skilled in the art will understand that other kinds of power converters and/or filter circuits can also be used. The base can be of bi-pin type instead of the screw base as illustrated herein, or any other type of lamp base with inner space no less than E-12 type lamp base. The vertical arrangement of the LEDs is generally linear and can extend substantially vertical or can be pointed in a particular direction. In a substantially vertical embodiment, the arrangement need not be precisely vertical, indeed the LEDs may be offset from each other by a few degrees, or the whole stacked arrangement of LEDs may be offset from the vertical position by a few degrees. In either case, a person skilled in the art will understand that such variances are acceptable in the operation of the LED bulb of the present invention.

Figure 3A:
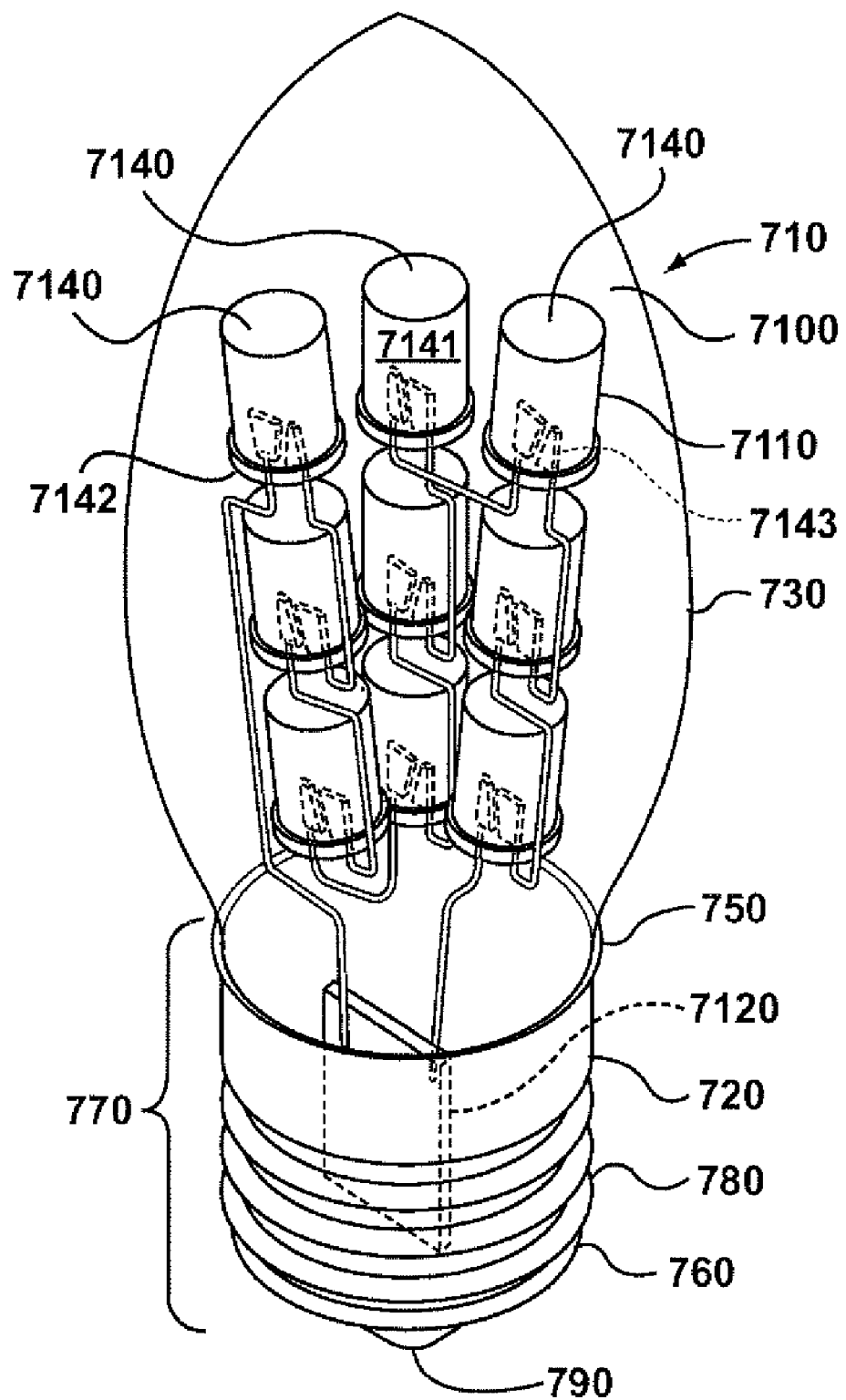
FIG. 3A is a perspective view of an LED bulb in accordance with another embodiment of the present invention.

FIG. 3A is an illustration of an LED bulb in accordance with another embodiment of the present invention. The LED bulb 710 comprises a hollow base 720 with an open end 750, a closed end 760 and a sleeve 770 therebetween, a hollow shell 730 connected to the open end 750 of the base 720, and a compartment 7100 formed by the shell 730 and the base 720. The sleeve 770 has external threading 780 to be installed in an internally threaded bulb holder. The sleeve 770 serves as one electrode. The closed end 760 has a contact portion or point 790 serving as another electrode. An insulating part (8171 in FIG. 7), made of rubber or other insulating material, separates and insulates the two parts 770 and 790. In the sleeve portion 770 of the compartment 7100 is located a power converter 7120 for converting AC to DC and supplying DC power to the LEDs.

The bulb 710 in FIG. 3A further comprises more than one substantially linear strand of LEDS. In the specific embodiment illustrated in FIG. 3A three strands are illustrated and each is referred to by reference numeral 7140. Each strand 7140 comprises in this specific embodiment, three LEDs 7110. The number of LEDS per strand may vary and the number of strands may vary all contained within compartment 7100 so as to increase the luminance created by the bulb. Each LED comprises a base 7142 having electrical terminals 7143 and an envelope 7141 extending from the base to the envelope top end distal from the base. The LEDs 7110 in each strand 7140 are joined in a linear orientation. They are connected in series with each other and also connected in series with the power converter. In the bulb 710 in FIG. 3A, the strands 7140 are each oriented in a substantially linear and vertical orientation within the compartment 7100 such that for all but the last LED in each strand, the envelope top end of any given LED of a strand substantially faces the base of an adjacent LED in the strand. Though FIG. 3A illustrates three strands each having three LEDs in the bulb, the number of strands and LEDs contained in the bulb can vary from two to any number that can be contained within compartment 7100 depending on the dimensions of the bulb shell.

Figure 5A:
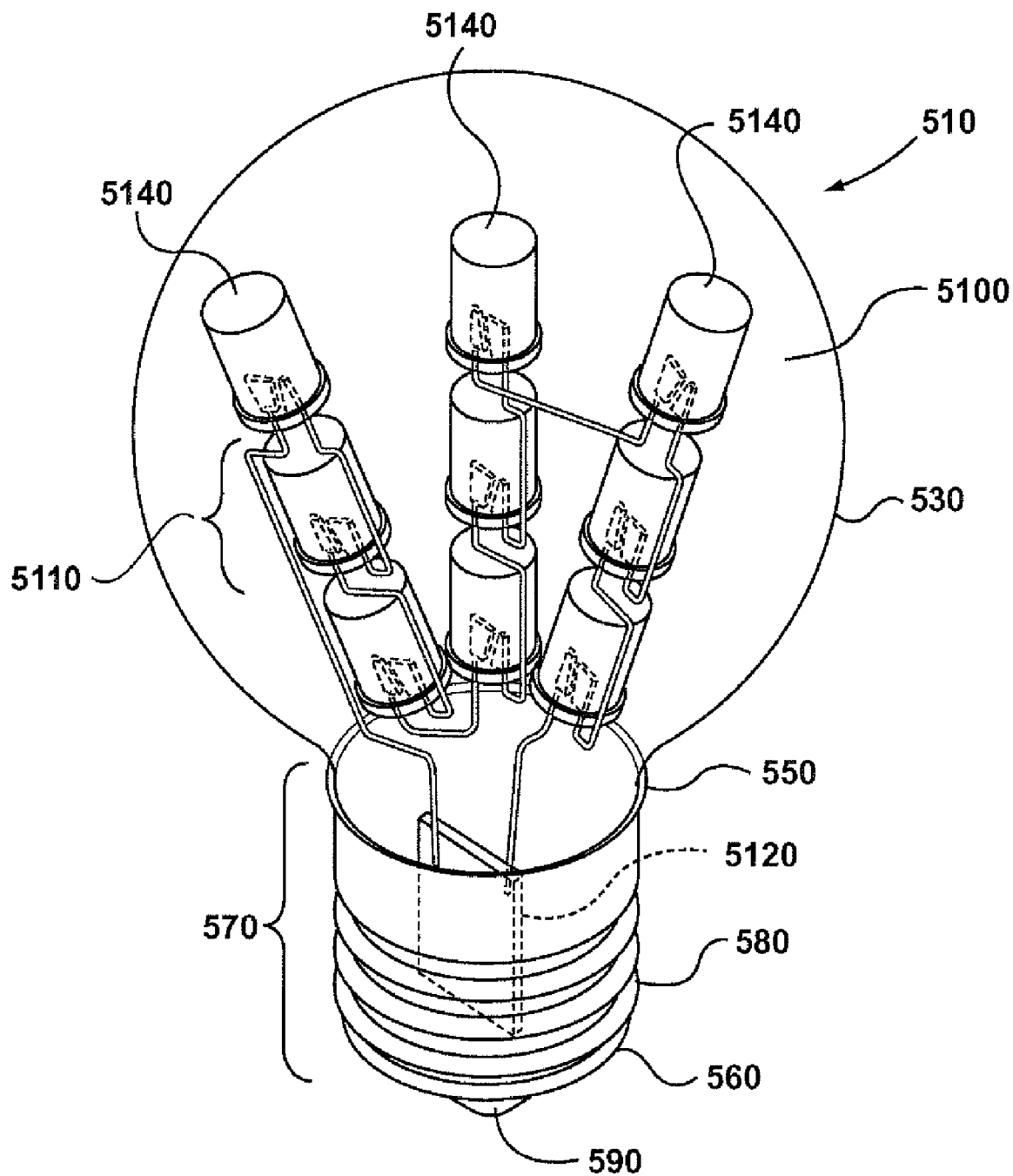
FIG. 5A is a perspective view of an LED bulb in accordance with another embodiment of the present invention.

FIG. 5A is an illustration of an LED bulb in accordance with another embodiment of the present invention. The LED bulb 510 comprises a hollow base 520 with an open end 550, a closed end 560 and a sleeve 570 therebetween, a hollow shell 530 connected to the open end 550 of the base 520, and a compartment 5100 formed by the shell 530 and the base 520. The sleeve 570 has external threading 580 to be installed in an internally threaded bulb holder. The sleeve 570 serves as one electrode. The closed end 560 has a contact portion or point 590 serving as another electrode. An insulating part (8171 in FIG. 7), made of rubber or other insulating material, separates and insulates the two parts 570 and 590. In the sleeve portion 570 of the compartment 5100 is located a power converter 5120 for converting AC to DC and supplying DC power to the LEDs.

The specific embodiment illustrating bulb 510 FIG. 5A illustrates three substantially linear strands 5140, each strand comprising three LEDs 5110 contained within the compartment 5100 thereby increasing and enhancing the luminance created by the bulb. In contrast to the strands 7140 in FIG. 3A, the strands 5140 in FIG. 5A are joined to form an array whereby each strand 5140 points in a different direction within compartment 5100. The shell 530 in FIG. 5A is larger than the shell 730 in FIG. 3A in order to accommodate the arrangement of the strands 5140. The LEDs 5110 are stacked such that for all but the last LED in each strand, the envelope top end of any given LED of a strand substantially faces the base of an adjacent LED in the strand and connected in series with each other and also connected in series with the power converter. A strand 5140 may be joined together with the other strands 5140 at one or more points along the length of the strand 5140. Though FIG. 5A illustrates three strands each having three LEDs in the bulb, the number of strands and LEDs contained in the bulb can vary from one to any number that can be arrayed within compartment 5100. There can be a number of strands each having at least two LEDs. The strands need not have the same number of LEDs but on the other hand they may have the same number of LEDs.

Figure 5B:
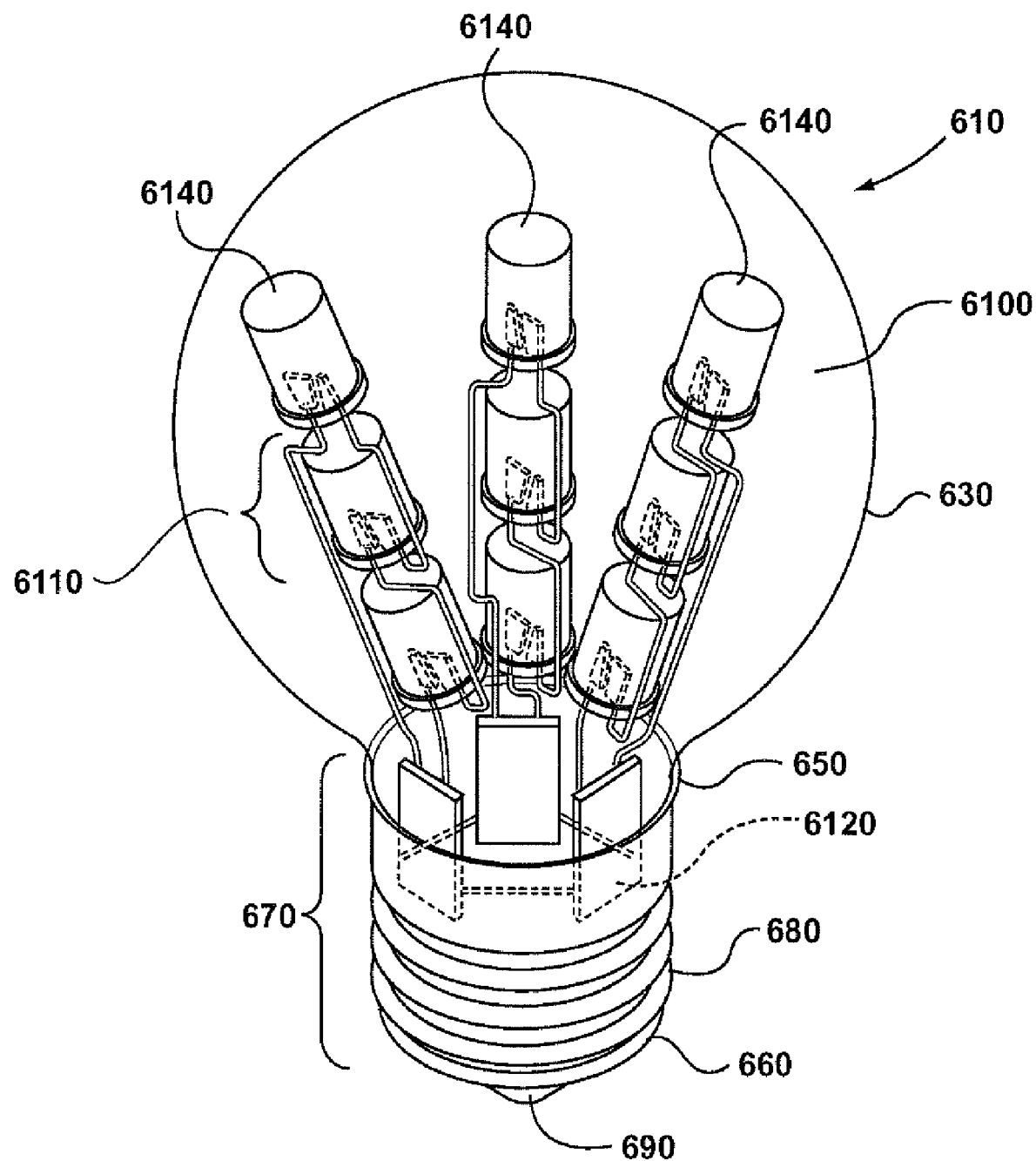
FIG. 5B is a perspective view of an LED bulb in accordance with another embodiment of the present invention.

FIG. 5B is an illustration of an LED bulb in accordance with another embodiment of the present invention. The LED bulb 610 comprises a hollow base 620 with an open end 650, a closed end 660 and a sleeve 670 therebetween, a hollow shell 630 connected to the open end 650 of the base 620, and a compartment 6100 formed by the shell 630 and the base 620. The sleeve 670 has external threading 680 to be installed in an internally threaded bulb holder. The sleeve 670 serves as one electrode. The closed end 660 has a contact portion or point 690 serving as another electrode. An insulating part (8171 in FIG. 7), made of rubber or other insulating material, separates and insulates the two parts 670 and 690. In the sleeve portion 670 of the compartment 6100 is located a power converter 6120 for converting AC to DC and supplying DC power to the LEDs.

The bulb 610 further comprises three substantially linear strands 6140, each strand comprising three LEDs 6110 contained within the compartment 6100 so as to increase the luminance created by the bulb. Unlike the strands 7140 in FIG. 3A, the strands 6140 in FIG. 5B are joined to form an array whereby each strand 6140 points in a different direction within compartment 6100. The shell 630 in FIG. 5B is larger than the shell 730 in FIG. 3A in order to accommodate the arrangement of the strands 6140. The LEDs 6110 are stacked such that for all but the last LED in each strand, the envelope top end of any given LED of a strand substantially faces the base of an adjacent LED in the strand and each strand 6140 is connected to the other strands 6140 such that the connection between strands 6140 occurs between LEDs 6110 closest in proximity to the sleeve portion 670. Though FIG. 5B illustrates three strands each having three LEDs in the bulb, the number of strands and LEDs contained in the bulb can vary from one to any number that can be arrayed within compartment 6100.

Figure 6:
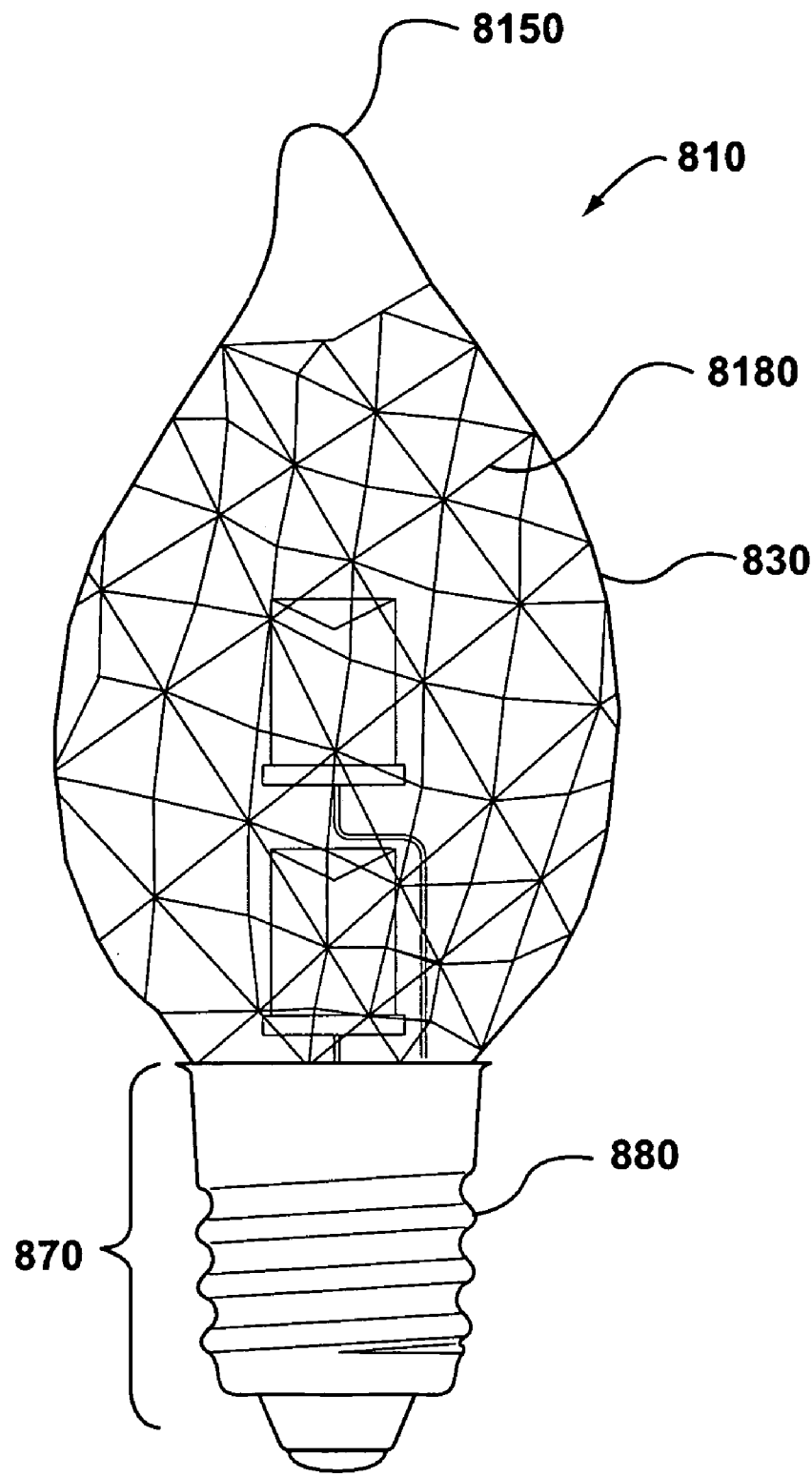
FIG. 6 is a side view of an LED bulb in accordance with a decorative bulb embodiment of the present invention illustrating the typical bulb surface of a Christmas bulb.
Figure 7:
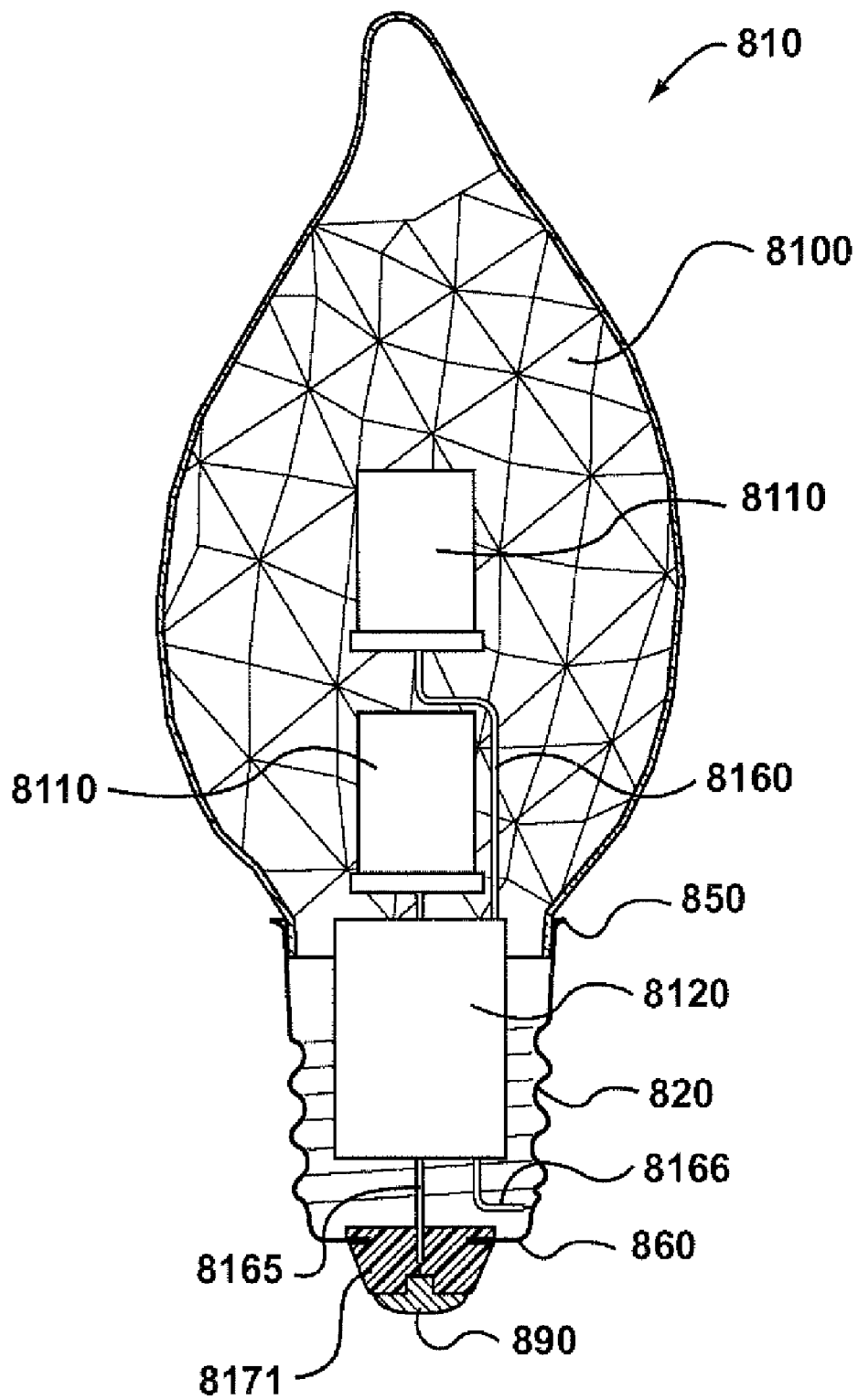
FIG. 7 is a section of the bulb illustrated in FIG. 6 illustrating the interior components of the bulb.

FIGS. 6 and 7 are illustrations of an LED bulb in accordance with another embodiment of the present invention. The LED bulb 810 comprises a hollow base 820 with an open end 850, a closed end 860 and a sleeve 870 therebetween, a hollow shell 830 connected to the open end 850 of the base 820, and a compartment 8100 formed by the shell 830 and the base 820. The shell 830 has a thickness 8170 and an outer surface 8180. The sleeve 870 has external threading 880 to be installed in an internally threaded bulb holder. The sleeve 870 serves as one electrode. The closed end 860 has a contact portion or point 890 serving as another electrode. An insulating part 8171, made of rubber or other insulating material, separates and insulates the two parts 870 and 890. In the sleeve portion 870 of the compartment 8100 is located a power converter 8120 for converting AC to DC and supplying DC power to the LEDs. The power converter is connected to point 890 by wire 8165 and to sleeve 870 by wire 8166.

The particular example illustrated by bulb 810 in FIGS. 6 and 7 comprises two LEDs 8110 contained within the compartment 8100 so as to increase the luminance created by the bulb. The LEDs 8110 are stacked such that for all but the last LED in each strand, the envelope top end of any given LED of a strand substantially faces the base of an adjacent LED in the strand and connected in series with each other by wires 8160 and also connected in series with the power converter. The bulb in FIGS. 6 and 7 has a traditionally narrowed tip end 8150 consistent with decorative bulbs of the holiday seasons. Although FIGS. 6 and 7 illustrate two LEDs in the bulb, the number of LEDs contained in the bulb can vary from two to any number that can be linearly contained within compartment 8100 and in this embodiment the strand of two LEDs is arranged in a substantially vertically orientation.

A globe bulb may be used, for example in Halloween lights may which may be shaped like a pumpkin. Other arrangements of single substantially linear strands and multiple substantially linear strands would be known to a person skilled in the art and would be suitable for bulbs of varying sizes and shapes.

Though in the embodiment illustrated herein the LEDs are connected in series, those skilled in the art will understand that the LEDs can also be connected in parallel. However, even though the LED bulb can contain a large number of LEDs because the voltage drop across each LED is small, due to the difficulties of constructing a circuit with LEDs in parallel, the number of LEDs that can be connected in parallel is limited by the amount of the voltage drop.

By stacking LEDs in substantially linear strands arranged such that for all but the last LED in each strand, the envelope top end of any given LED of a strand substantially faces the base of an adjacent LED in the strand, an LED bulb of the present invention is able to distribute light evenly within the entirety of the bulb compared to the prior art including where the bulb is pointed such as in a Christmas tree bulb or the bulbs of outdoor lights which are strung at Christmas. This is possible because in accordance with an advantage of the present invention the distance from any location in a bulb to the closest LED to that location varies less in the bulb of the present invention than in a bulb of the prior art. For example, the distance between the top of the bulb shell and an LED fixed to the PCB in the prior art shown in FIG. 2 is much greater than the distance from the top of the bulb shell to the top-most LED in the stacked arrangement shown in FIG. 3. In this example, light from the top LED in the stack does not have to travel as far in the present invention to reach the top of the bulb shell, and therefore allows that location to appear brighter than it does in the prior art. In practice, this means that an LED bulb of the present invention using the same number of LEDs as the prior art bulb from FIG. 2 will appear brighter, especially when viewed from the side or from a long distance away.

The LED bulb of the present invention has other advantages over the prior art. It is possible to create larger bulbs while maintaining even brightness distribution by using multiple linear stacks oriented in substantially vertical or oriented diagonally, of LEDs arranged side-by-side. In this way, light can be distributed more evenly throughout the bulb, regardless of the size of the bulb, simply by adding more stacks of LEDs beside one another in the bulb.

It was also determined that the cost of manufacturing an LED bulb of the present invention that uses 2 to 4 LEDs is lower than the cost of manufacturing an LED bulb of the prior art using the same number of LEDs.

Note that it is possible to create an LED bulb of the prior art using multiple PCBs, each having multiple LEDs, where each PCB is positioned parallel to the other PCBs, both above and below the single PCB shown in FIG. 2. Depending on the arrangements of the LEDs on the PCBs, it is possible to increase the brightness of the LED bulb of the prior art in this way. However, in order to achieve brightness that is similar to the brightness of the LED bulb of the present invention, such a stacked-PCB design would require more LEDs and have increased manufacturing cost compared to the LED bulb of the present invention.

A test was carried out on an LED bulb of the present invention where the LEDs in the bulb were connected in a series arrangement as shown in FIG. 4 to determine how many LEDs could be used in that arrangement. For the test, an input voltage of 110V was used. In order to achieve the desired current of 10 mA to 13 mA for proper operation of the LEDs, an input resistor with a resistance of 560 Ohms was used causing the voltage to drop to 90V. Since the maximum voltage drop across each single LED was 3.4V, the maximum number of LEDs that could be used in the circuit was determined by the calculation 90V divided by 3.4V per LED, or 26.47 LEDs. Therefore the maximum number of LEDs arranged in series was determined to be 26. However, during testing, it was found that the input resistor will become overheated when there are more than 23 LEDs connected in series. For safety concerns, the maximum number of LEDs that were connected in series in this test was 20. It should be noted that the number of LEDs vertically positioned in a bulb is also limited by the size of the bulb shell.

In another test, it was shown that the LED bulb according to the embodiments of the present invention can provide energy savings of up to 90% compared with a traditional incandescent light bulb. In this test, a LED bulb of the present invention having 3 LEDs was compared with 120V 3 W C7 and C9 type incandescent lamp bulbs, which are known to the applicant to be amongst the lowest power consuming incandescent light bulbs in the North American market. The test results showed that the LED bulb consumed power in the range of 0.3 W to 0.35 W, which is a savings of nearly 90% compared to the 3 W consumed by the C7 and C9 incandescent bulbs.

The LED bulb can be used in various applications, such as household, work plant, show window, store, street display, exterior decorations. The LED bulbs of the present invention are applicable in many setting requiring light and can provide enhanced luminescence and brightness over prior art LED bulbs at a lower cost of manufacturing as described herein. The luminance of the LED bulb can be adjusted by including various LEDs in the bulb.

While this invention has been illustrated and described in connection with only certain embodiments thereof, various changes, modifications and amendments can occur to those skilled in the art without departing from the spirit and the scope of the invention as defined in the appended claims.

What is claimed is:

1. A bulb, comprising:
a base, said base further comprising a closed end, an open end and a sleeve therebetween, wherein said sleeve serves as an electrode and said closed end comprises a contact point serving as another electrode;
a hollow shell connected to said open end of said base;
a strand of at least two LEDs, each LED comprising a base having electrical terminals and an envelope extending from said base to an envelope top end distal from said base, said LEDs joined together and arranged within the shell such that for all LEDs, but for the last LED, in each strand, said envelope top end of any given LED in said strand substantially faces said base of an adjacent LED in said strand,
a self-supporting wire connecting one terminal of an LED in said strand to a next LED in said strand, such that said wire acts to support said strand; and
wherein said bulb is adapted for connection to a power source.

2. The bulb according to claim 1, wherein the shell is made of translucent or transparent plastic.

3. The bulb according to claim 1, wherein the shell is made of translucent or transparent glass.

4. The bulb according to claim 1, wherein the LEDs are connected in parallel.

5. The bulb according to claim 1, wherein the LEDs are connected in series.

6. The bulb according to claim 1, including a hollow plastic stem adapted to contain the at least two LEDs.

7. The bulb according to claim 6, wherein the LEDs are oriented in a substantially vertical direction in relation to said bulb.

8. The bulb according to claim 1, wherein the base of the bulb is hollow, and, within the hollow base, the bulb further comprises a power converter for converting AC power to DC power to be supplied to the LEDs.

9. The bulb of claim 8, wherein
both the two electrodes are connected to the input of the power converter; and
the bulb further comprises an insulating part separating and insulating the two electrodes.

10. The bulb according to claim 9, wherein the power converter includes a filter circuit, a bridge rectifier circuit, and a resistor; the bridge rectifier circuit is connected to the electrodes via the filter circuit, and the output of the bridge rectifier circuit is connected to LEDs via the resistor.

11. The bulb according to claim 10, wherein the sleeve of the base includes external threading.

12. An LED bulb, the bulb comprising:
a base, said base further comprising a closed end, an open end and a sleeve therebetween, wherein said sleeve serves as an electrode and said closed end comprises a contact point serving as another electrode;

a hollow shell connected to the open end of the base;

at least two strands of LEDs wherein each strand of LEDs comprises at least two LEDs, each LED comprising a base having electrical terminals and an envelope extending from said base to an envelope top end distal from said base, said LEDs joined together and arranged within the shell such that for all LEDs, but for a last LED, in each strand, said envelope top end of any given LED in said strand substantially faces said base of an adjacent LED in said strand;

a self-supporting wire connecting one terminal of an LED in each strand to a next LED in each strand, such that said wire acts to support said strand, and wherein said bulb is adapted for connection to a power source.

13. The bulb according to claim 12 wherein said strands of LEDs are joined to form an array whereby each strand points in a different direction within said hollow shell.

14. The bulb according to claim 12 wherein said strands are each oriented in a substantially vertical orientation within said hollow shell.

15. The bulb according to claim 12 wherein the LEDs are connected in parallel within each strand.

16. The bulb according to claim 12 wherein the LEDs are connected in series within each strand.

* * * * *